(12) United States Patent
Chiang et al.

(10) Patent No.: US 8,746,409 B2
(45) Date of Patent: Jun. 10, 2014

(54) LINEAR TRANSMISSION ASSEMBLY HAVING LUBRICANT RECOVERY MODULE

(75) Inventors: Tsung-Hsien Chiang, Taichung (TW); Fu-Chun Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 497 days.

(21) Appl. No.: 13/250,573

(22) Filed: Sep. 30, 2011

(65) Prior Publication Data

US 2013/0081490 A1 Apr. 4, 2013

(51) Int. Cl.
| F01M 1/06 | (2006.01) |
| F16N 9/00 | (2006.01) |
| F16N 9/04 | (2006.01) |
| F16C 33/02 | (2006.01) |
| F16N 9/02 | (2006.01) |
| F16H 25/20 | (2006.01) |
| F16C 29/00 | (2006.01) |

(52) U.S. Cl.
USPC .............................. 184/7.1; 74/89.44; 384/13

(58) Field of Classification Search
CPC ........... F16N 7/12; F16N 39/04; F16N 31/02; F16N 9/00
USPC ........................ 184/1–109; 74/89.44; 384/13
See application file for complete search history.

(56) References Cited

U.S. PATENT DOCUMENTS

| 2,831,314 | A | * | 4/1958 | Mulholland | ................... | 57/120 |
| 2,905,269 | A | * | 9/1959 | Mulholland | ................... | 184/7.1 |
| 2,996,871 | A | * | 8/1961 | Wayson | ........................ | 57/120 |
| 3,043,085 | A | * | 7/1962 | Wayson | ........................ | 57/120 |
| 3,669,219 | A | * | 6/1972 | Wayson et al. | ................. | 184/7.1 |
| 3,872,662 | A | * | 3/1975 | Atwood et al. | ................. | 57/120 |
| 4,077,492 | A | * | 3/1978 | Inoue | ............................. | 184/64 |
| 4,098,067 | A | * | 7/1978 | McLean | ........................ | 57/120 |
| 5,178,232 | A | * | 1/1993 | Bennett et al. | ............... | 184/6.14 |
| 7,568,554 | B2 | * | 8/2009 | Umber et al. | ................. | 184/55.2 |
| 2007/0227281 | A1 | * | 10/2007 | Chen et al. | ................... | 74/89.44 |
| 2008/0257082 | A1 | * | 10/2008 | Chuo | ........................... | 74/89.44 |
| 2011/0146430 | A1 | * | 6/2011 | Chen et al. | ................... | 74/89.44 |
| 2012/0266703 | A1 | * | 10/2012 | Chuo | ........................... | 74/89.44 |

FOREIGN PATENT DOCUMENTS

| TW | I263744 | 10/2006 |
| TW | I279497 | 4/2007 |

* cited by examiner

*Primary Examiner* — William E Dondero
*Assistant Examiner* — Robert T Reese
(74) *Attorney, Agent, or Firm* — Muncy, Geissler, Olds & Lowe, P.C.

(57) ABSTRACT

A linear transmission assembly having a lubricant recovery module is composed of a movable member having a chamber; a first oil wick inserted into the movable member and the chamber and having a first oil-absorbable portion and a first oil-dischargeable portion; an oil tank mounted to the movable member and having an oil room for storage of lubricating oil; a second oil wick mounted to the oil tank and having a second oil-absorbable portion and a second oil-dischargeable portion, the former of which extends into the oil room for contact with the lubricating oil and the latter of which reaches the chamber; and a third oil wick having a third oil-absorbable portion and a third oil-dischargeable portion, the former of which reaches the chamber and the latter of which does not contact the lubricating oil. Thus, the lubricating can be prevented from overspill and staining the linear transmission device.

9 Claims, 16 Drawing Sheets

US 8,746,409 B2

LINEAR TRANSMISSION ASSEMBLY HAVING LUBRICANT RECOVERY MODULE

BACKGROUND OF THE INVENTION

1. Field of the Invention

The present invention relates generally to a linear transmission assembly, and more particularly, to a linear transmission assembly having a lubricant recovery module.

2. Description of the Related Art

The linear component is a common transmission part in the industry and a large number of the linear components are applied to a variety of machines in need of linear movement for moving workpieces, moving cargo, arranging workpieces, or miscellaneous purposes. As indicated above, the linear component plays an important role regarding transmission in the industry and functions as frequent movement in operation. Since it needs frequent movement, the linear component needs good lubrication for longer service life.

Taiwan Patent Nos. I26377 and I27947 each disclose a solution to the lubricant issue, i.e. an oil wick is employed for absorbing the lubricating oil via capillary action for lubricating the linear component. However, the capillary action generated by the oil wick proceeds endlessly, so the lubricating oil is subject to excess to the linear component (e.g. screw rod or linear rail), to spill the lubricating oil to further stain the linear component.

SUMMARY OF THE INVENTION

The primary objective of the present invention is to provide a linear transmission assembly having a lubricant recovery module for preventing the lubricating oil from staining a linear transmission device thereof.

The foregoing objective of the present invention is attained by the linear transmission assembly, which coordinates with a long shaft to constitute a linear transmission device. The linear transmission assembly is composed of a movable member, a first oil wick, an oil tank, a second oil wick, and a third oil wick. The movable member is mounted to the long shaft for reciprocation with respect to the long shaft and includes a chamber. The first oil wick is inserted into the movable member and the chamber and includes a first oil-absorbable portion and a first oil-dischargeable portion; the former is mounted inside the chamber and the latter extends out of the movable member for contact with the long shaft. The oil tank is mounted to the movable member and includes an oil room and for storage of the lubricating oil. The second oil wick is mounted to the oil tank and includes a second oil-absorbable portion and a second oil-dischargeable portion; the former extends into the oil room for contact with the lubricating oil and the latter extends out of the oil tank and reaches the chamber. The third oil wick is mounted to the oil tank and includes a third oil-absorbable portion and a third oil-dischargeable portion; the former extends out of the oil tank to reach the chamber and the latter is located inside the oil room without contact with the lubricating oil.

In light of the above, the lubricating oil in the oil room can be absorbed by the second oil-absorbable portion and then discharged by the second oil-dischargeable portion. Next, the first-oil-absorbable portion absorbs and conveys the lubricating oil to the first oil-dischargeable portion to lubricate the long shaft for lubricating the linear transmission device. In the meantime, the third oil-absorbable portion can absorb the lubricating oil and the third oil-dischargeable portion can discharge the lubricating oil recovered by the third oil-dischargeable portion to the oil room to prevent the first oil-dischargeable portion from discharging excessive lubricating oil and prevent the lubricating oil from overspill and staining the linear transmission device.

DETAILED DESCRIPTION OF PREFERRED EMBODIMENTS

Figure 1:
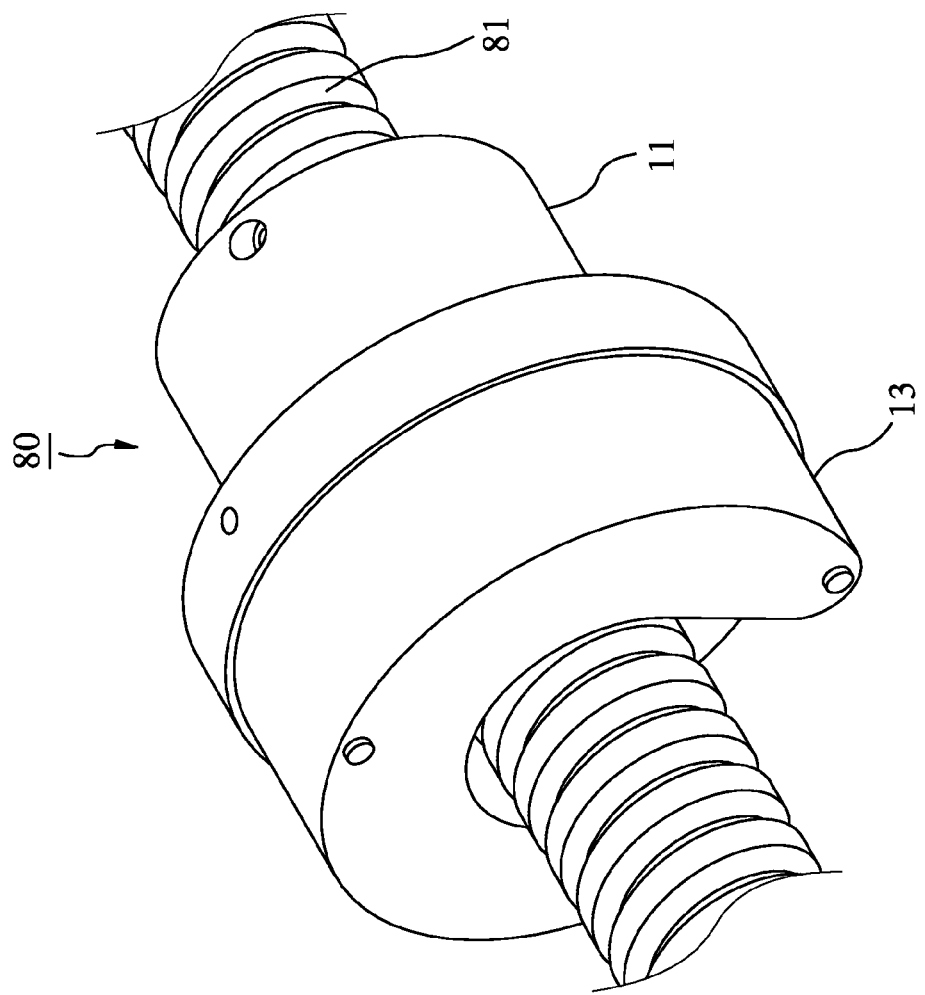
FIG. 1 is a perspective view of a first preferred embodiment of the present invention, illustrating an assembly of screw rod and screw nut as an example.
Figure 2:
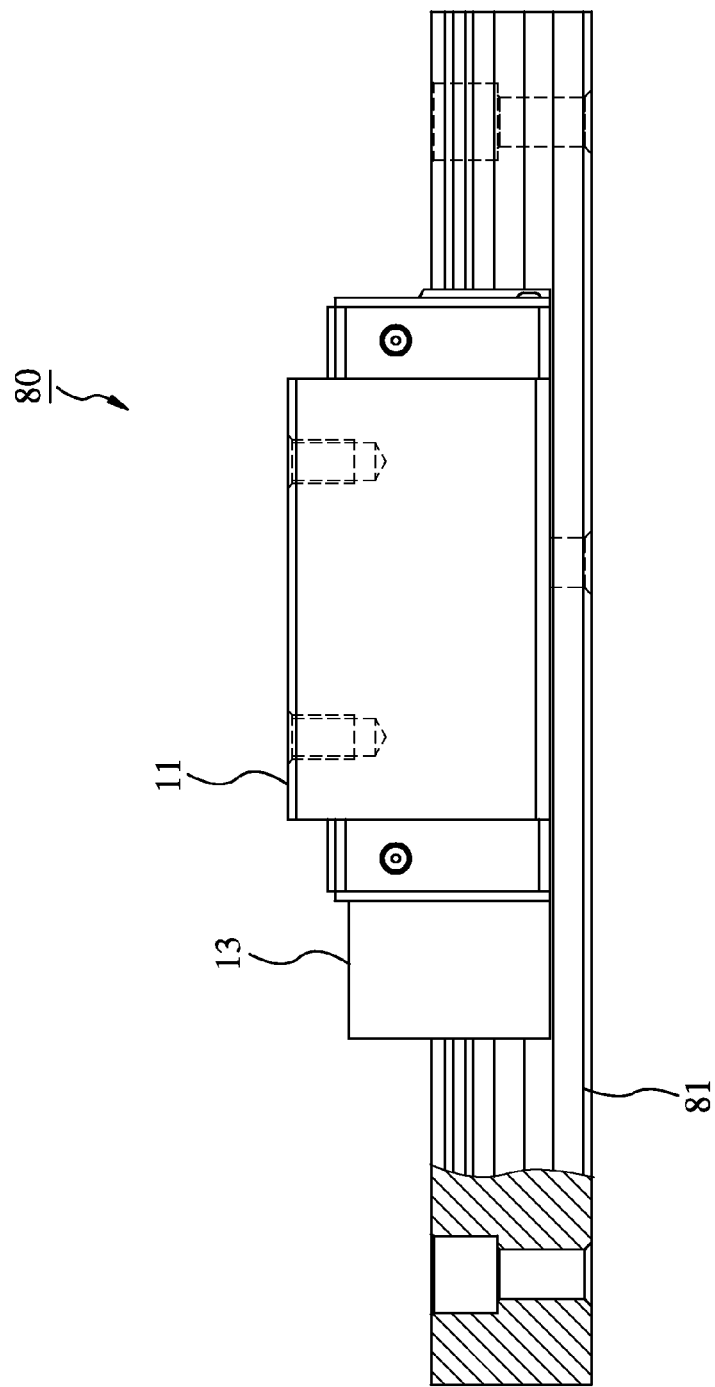
FIG. 2 is a side view of the first preferred embodiment of the present invention, illustrating a linear slide rail as an example.
Figure 3:
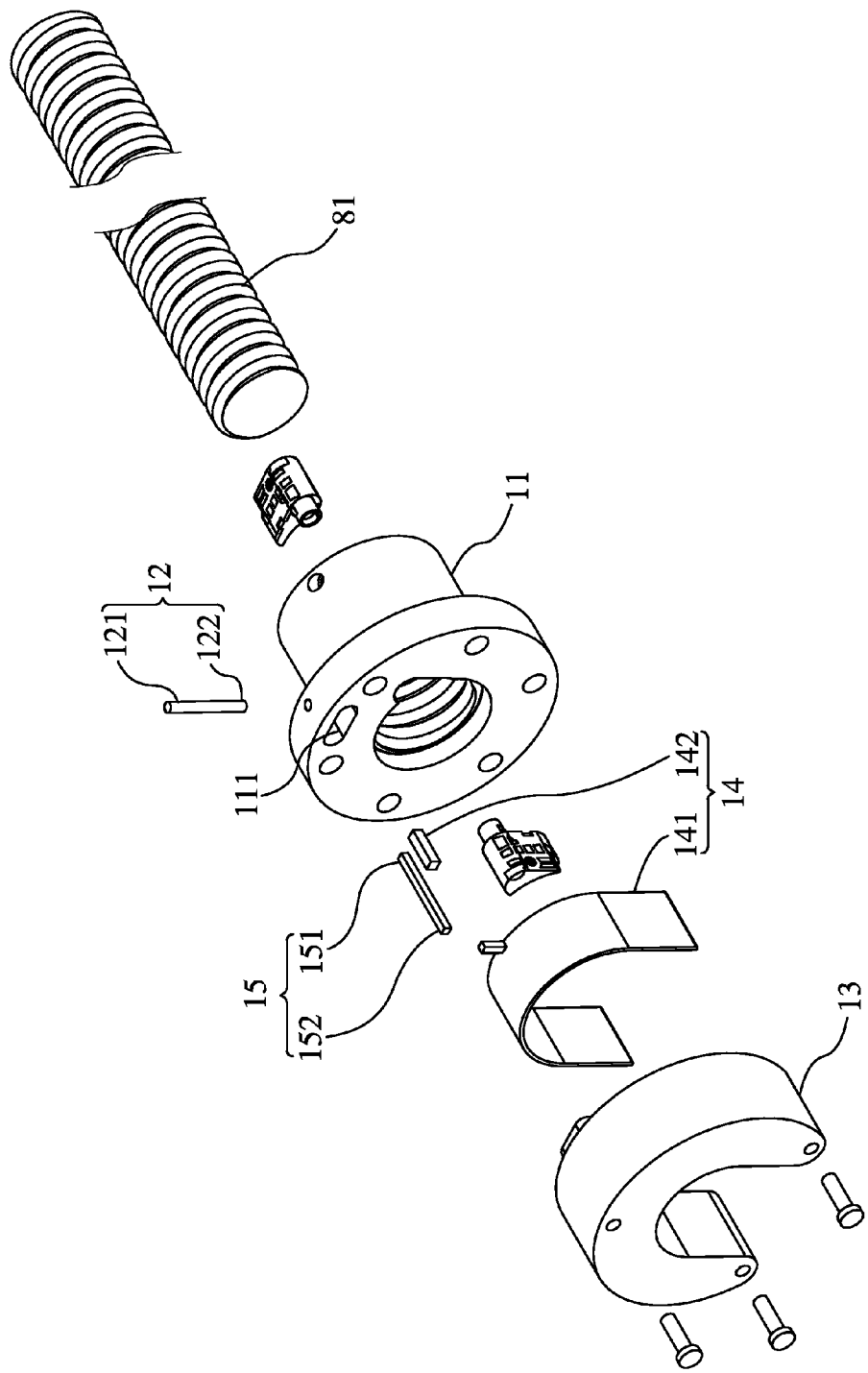
FIG. 3 is an exploded view of the first preferred embodiment of the present invention.
Figure 4:
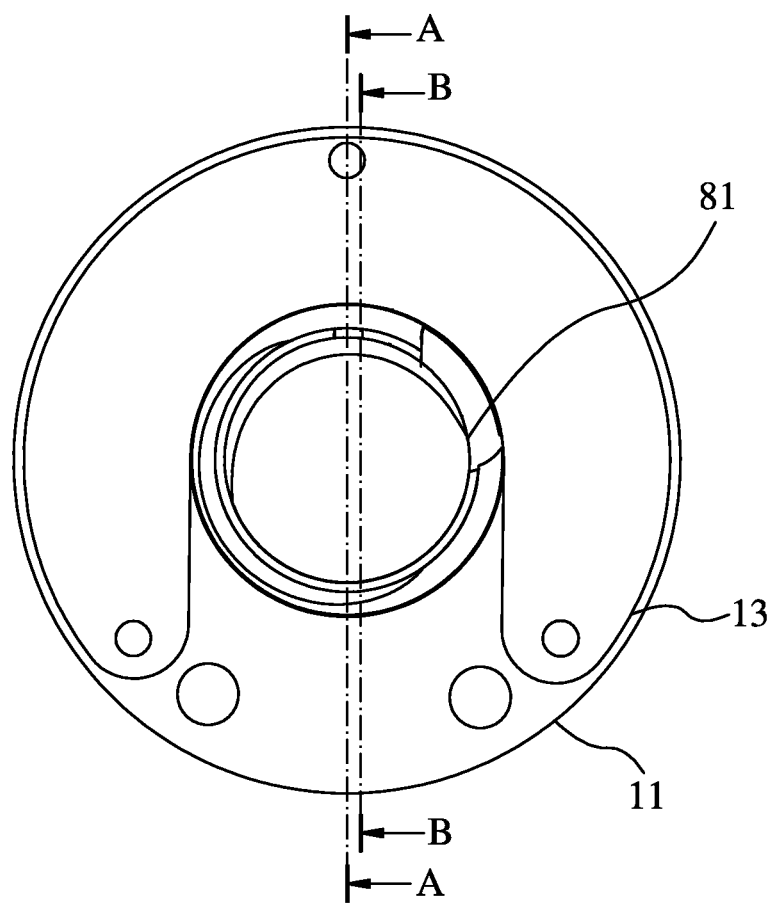
FIG. 4 is a front view of the first preferred embodiment of the present invention.
Figure 5:
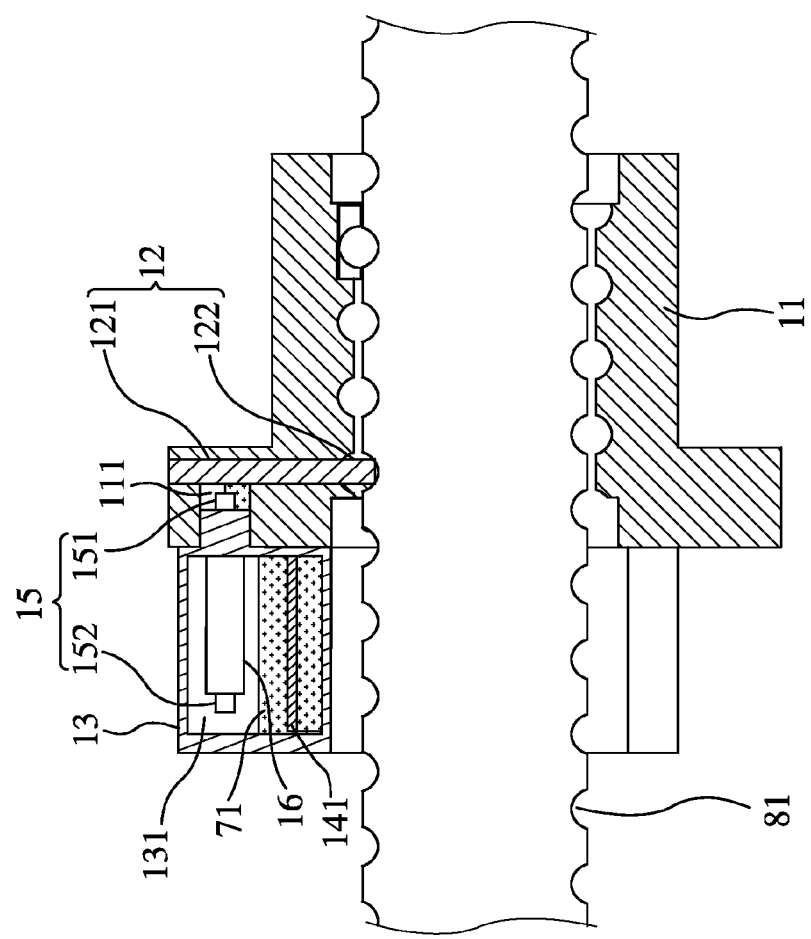
FIG. 5 is a sectional view taken from a line A-A indicated in FIG. 4.
Figure 6:
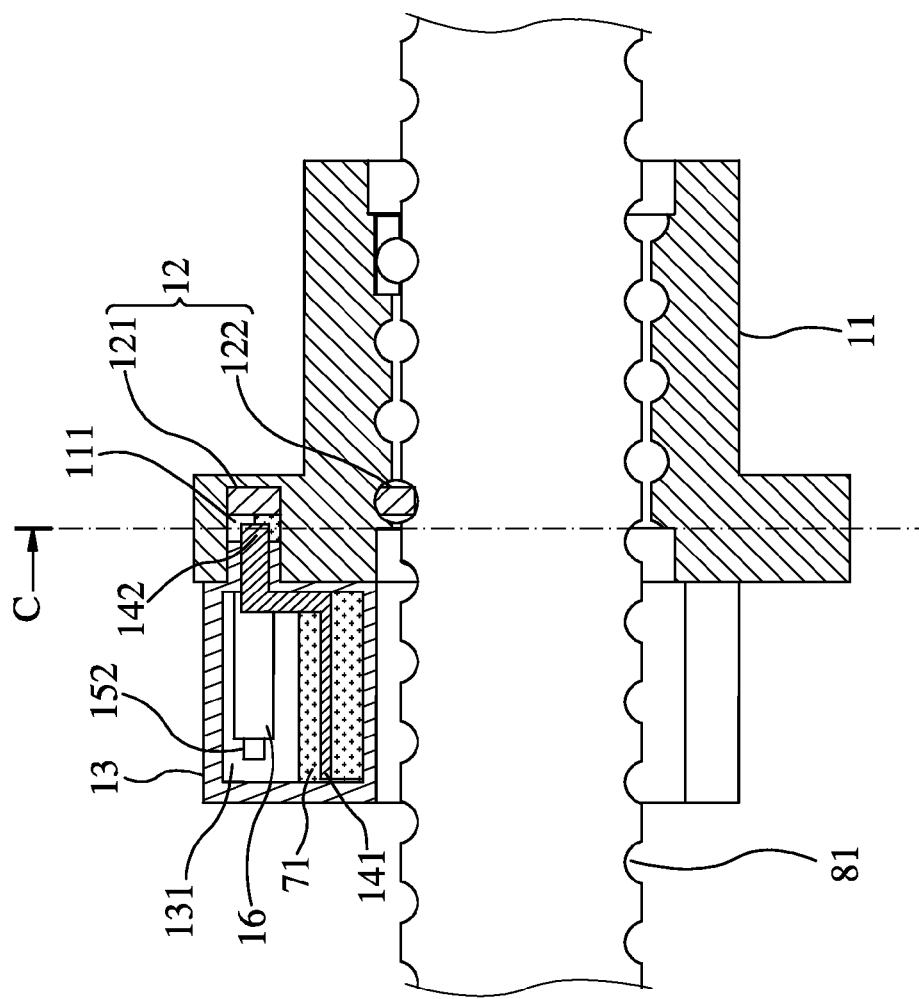
FIG. 6 is a sectional view taken from a line B-B indicated in FIG. 4.
Figure 7:
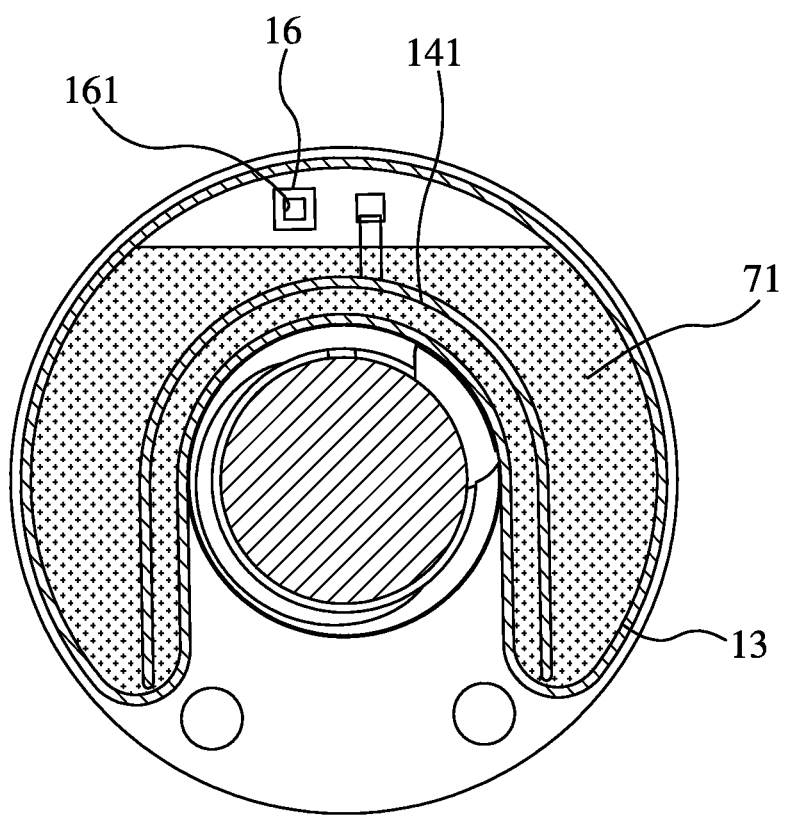
FIG. 7 is a sectional view taken from a line C-C indicated in FIG. 6.
Figure 8:
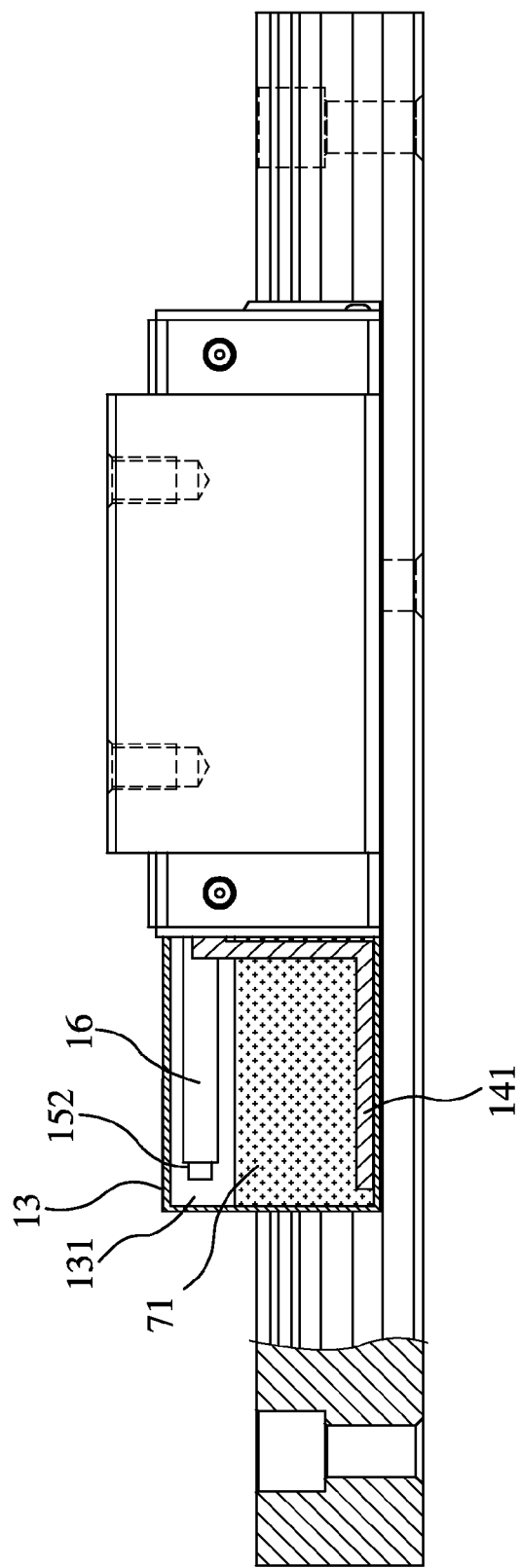
FIG. 8 is a sectional view of a part of the first preferred embodiment of the present invention, illustrating a linear slide rail as an example.

Referring to FIGS. 1-7, a linear transmission assembly having a lubricant recovery module in accordance with a first preferred embodiment of the present invention coordinates with a long shaft 81 to constitute a linear transmission device 80. The linear transmission assembly is composed of a movable member 11, a first oil wick 12, an oil tank 13, a second oil wick 14, and a third oil wick 15. It is to be noted that the linear transmission device 80 shown in FIG. 1 is an assembly of screw rod and screw nut and that shown in FIG. 2 is an assembly of linear slide rail. In the following preferred embodiments, the assembly of screw rod and screw nut and the assembly of linear slide rail are acted as examples for further clarification. The detailed descriptions and operations of these elements as well as their interrelations are recited in the respective paragraphs as follows.

The movable member 11 is mounted to the long shaft 81 and can reciprocate with respect to the long shaft 81. The movable member 11 includes a chamber 111.

The first oil wick 12 is inserted into the movable member 11 and the chamber 111 and includes a first oil-absorbable portion 121 and a first oil-dischargeable portion. The first oil-absorbable portion 121 is mounted inside the chamber. The first oil-dischargeable portion 122 is inserted through the movable member 11 for contact with the long shaft 81.

The oil tank 13 is mounted to the movable member 11 and includes an oil room 131 for storing lubricating oil 71.

The second oil wick 14 is mounted to the oil tank 13 and includes a second oil-absorbable portion 141 and a second oil-dischargeable portion 142. The second oil-absorbable portion 141 extends into the oil room 131 for contact with the lubricating oil 71. The second oil-dischargeable portion 142 is inserted through the oil tank 13 to reach the chamber 111.

The third oil wick 15 is mounted to the oil tank 13 and includes a third oil-absorbable portion 151 and a third oil-dischargeable portion 152. The third oil-absorbable portion 151 extends through the oil tank 13 to reach the chamber 11. The third oil-dischargeable portion 152 is located inside the oil room 131 without contact with the lubricating oil 71.

It is to be noted that the long shaft can be either transversal or upright and thus the present invention further includes an insulator 16 for securing that the third oil-dischargeable portion 152 is located inside the oil room 141 without contact with the lubricating oil 71. The insulator 16 is fixed to the oil tank 13 and includes a through hole 161 communicating with the oil room 131. The third oil-dischargeable portion 152 extends through the through hole 161 to be located inside the oil room 131 without contact with the lubricating oil 71.

In addition, in this embodiment, the third oil-absorbable portion 151 does not contact the first oil wick 12; however, if it is intended to prevent the first oil-dischargeable portion 122 from discharging too much lubricating oil, the third oil-absorbable portion 151 can be forced to contact the first oil-absorbable portion 121 or the second oil-chargeable portion 142 to enable the third oil-absorbable portion 151 to absorb the lubricating oil in the first oil-absorbable portion 121 or the second oil-dischargeable portion 142 to prevent the first oil-dischargeable portion 122 from discharging too much lubricating oil 71 resulting in overspill the lubricating oil and staining the linear transmission device.

It is still to be noted that each of the first, second, and third oil wicks 12, 14 & 15 are made of wool felt.

Referring to FIGS. 5-10, the first preferred embodiment of the present invention is illustrated under the circumstances that the long shaft 81 is put transversally or upright.

Referring to FIGS. 5-8, when the long shaft 81 is put transversally, the second oil-absorbable portion 141 absorbs the lubricating oil 71 from the oil room 131 and then the lubricating oil 71 is conveyed to the second oil-dischargeable portion 142 to enter the chamber 111. At this time, the first oil-absorbable portion 121 located inside the chamber 111 likewise keeps absorbing the lubricating oil 71 inside the chamber 111 and conveying the same to the first oil-dischargeable portion 122 for lubricating the linear transmission device 80. In the meantime, the third oil-absorbable portion 151 can keep absorbing the lubricating oil 71 inside the chamber 111 and then the third oil-dischargeable portion 152 can discharge the lubricating oil 71 back to the oil room 131 to prevent the first oil wick 12 from absorbing too much lubricating oil 71 resulting in overspill of the lubricating oil and staining the linear transmission device.

In fact, as indicated in the drawings, we are aware that the third oil-dischargeable portion 152 can still be located over the surface of the lubricating oil 71 without contact therewith to recover the lubricating oil 71 from the chamber 111 to the oil room 131 if the insulator 16 is not available while the long shaft 81 is put transversally. It is different from when the long shaft 81 is put upright.

Figure 9:
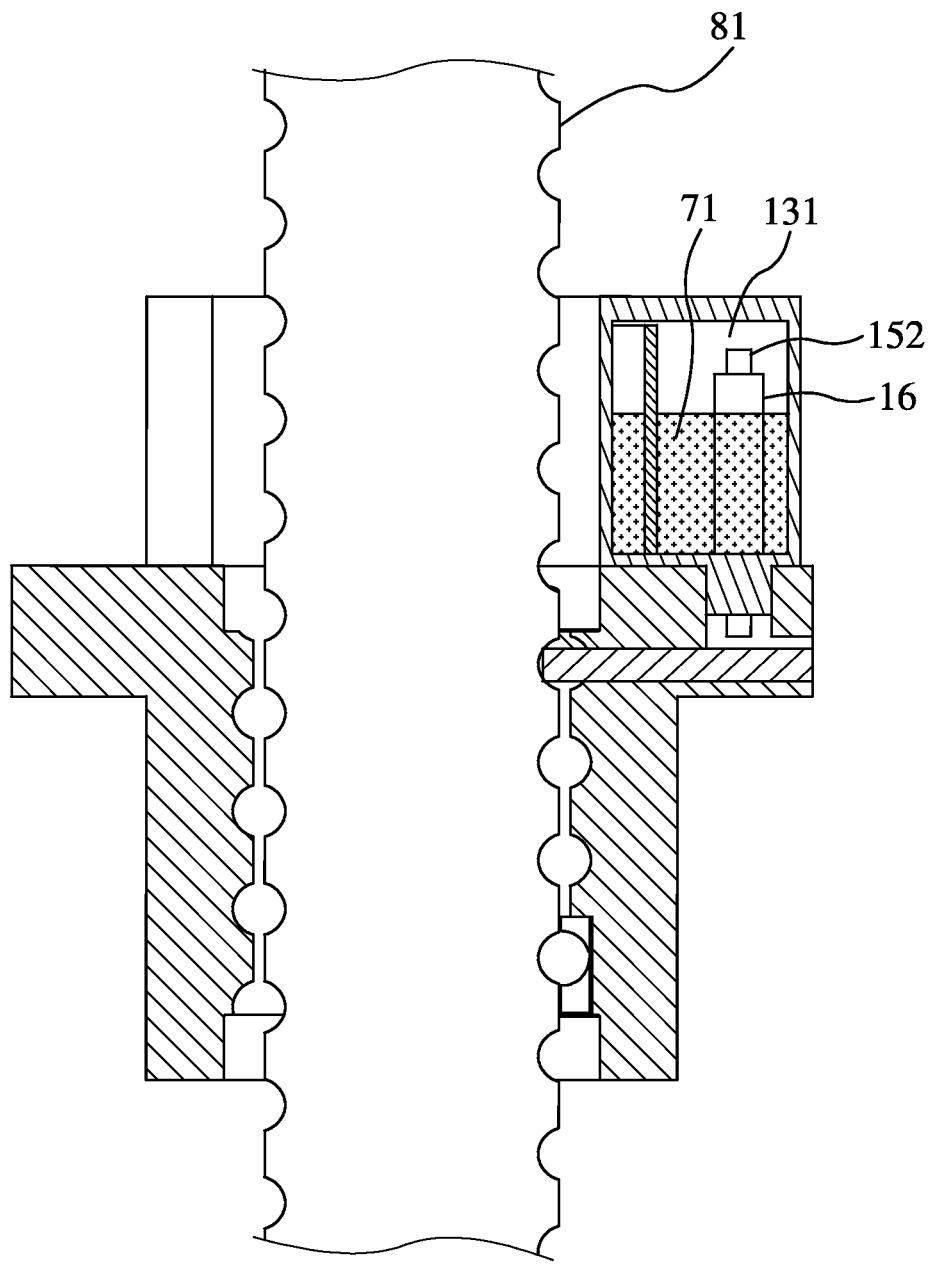
FIG. 9 is a sectional view of the first preferred embodiment of the present invention at work, illustrating that the long shaft is put upright.
Figure 10:
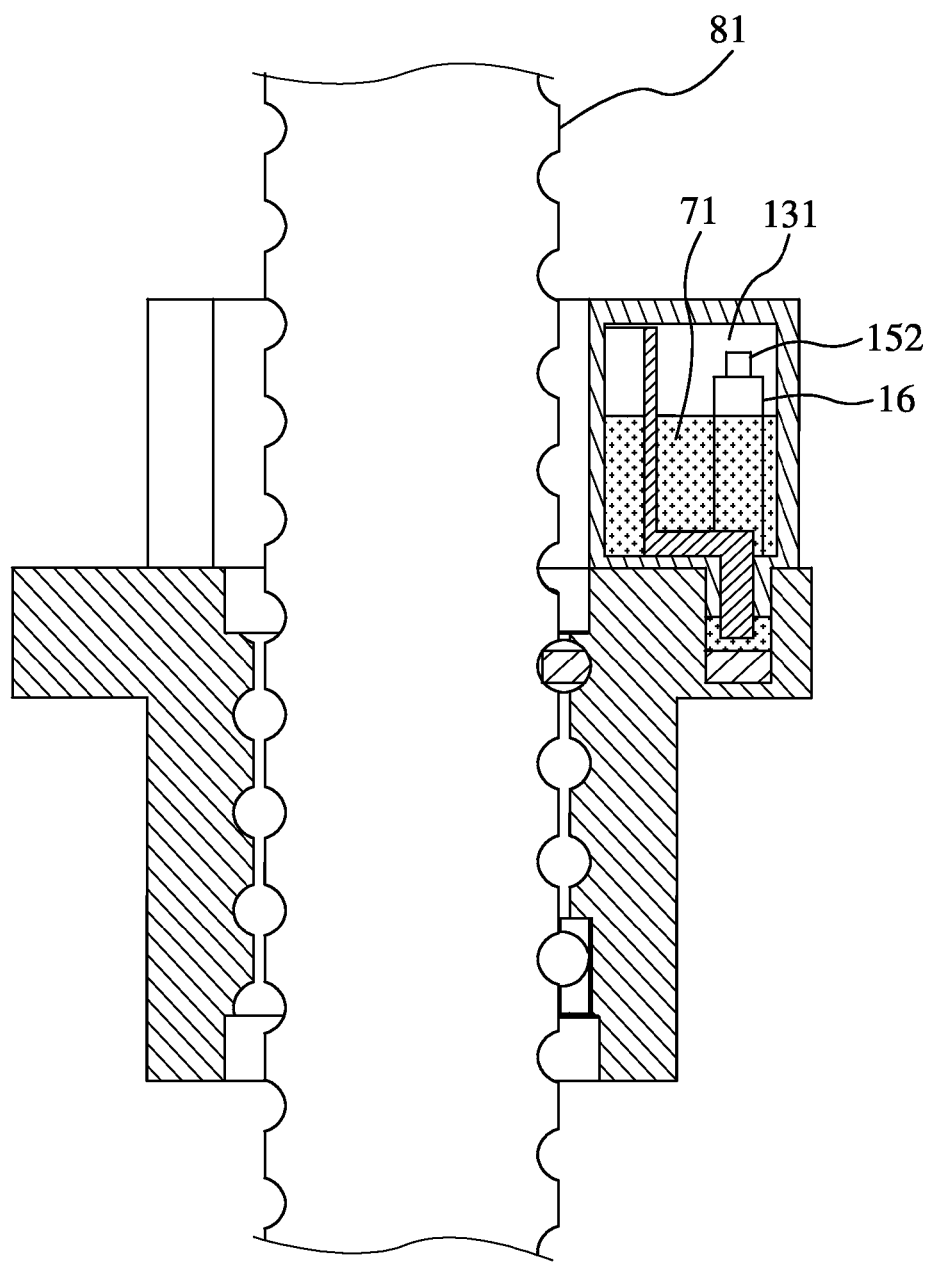
FIG. 10 is another sectional view of the first preferred embodiment of the present invention at work, illustrating that the long shaft is upright.
Figure 11:
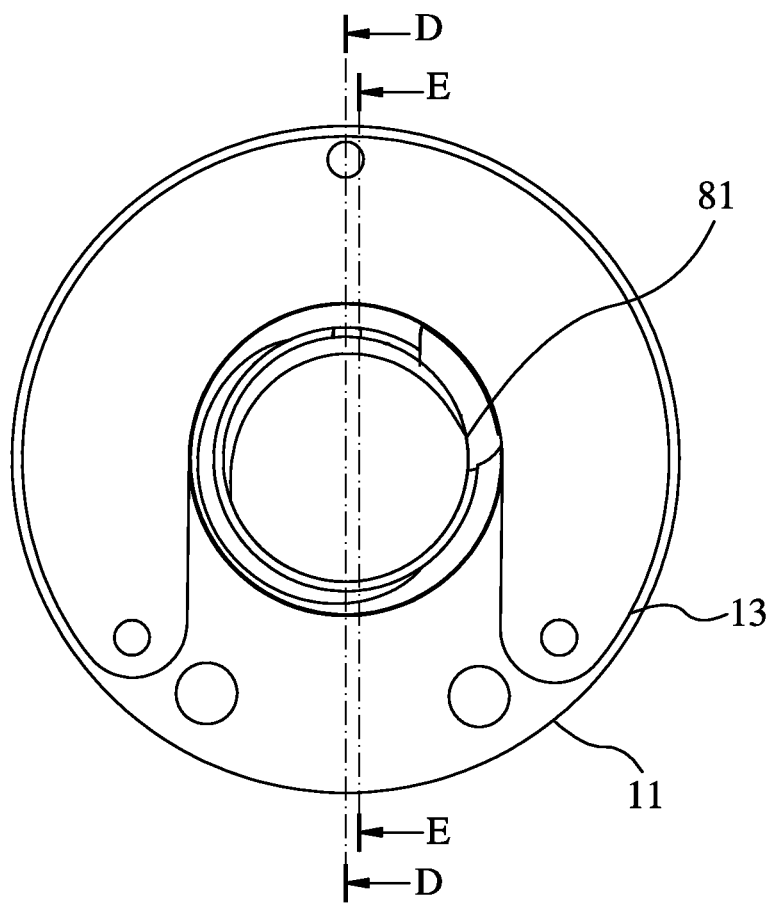
FIG. 11 is a front view of a second preferred embodiment of the present invention.
Figure 12:
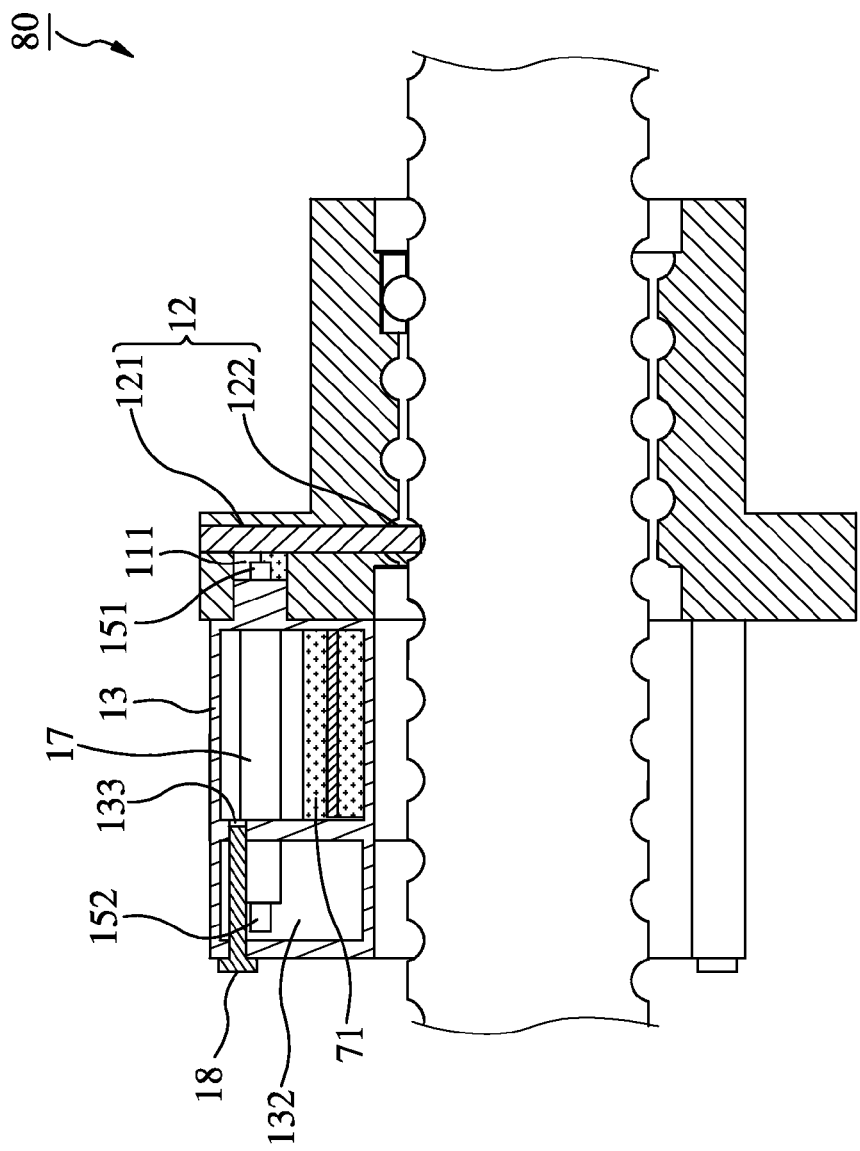
FIG. 12 is a sectional view taken from a line D-D indicated in FIG. 11.
Figure 13:
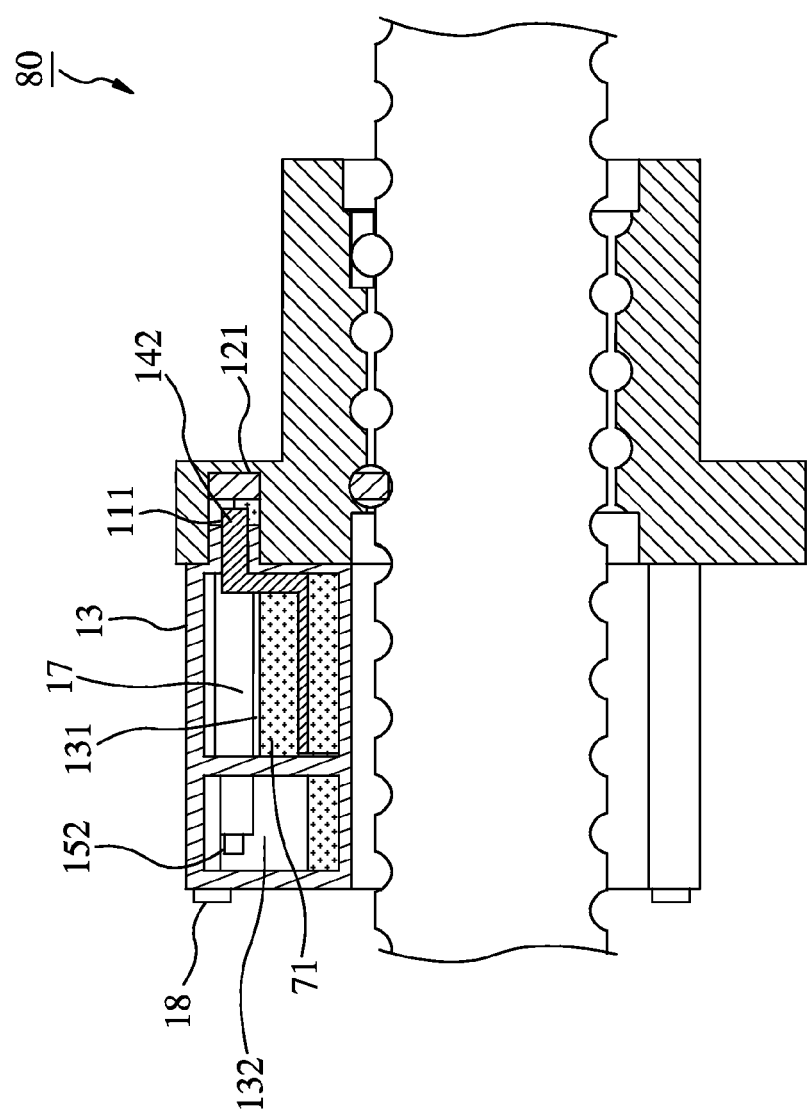
FIG. 13 is a sectional view taken from a line E-E indicated in FIG. 11.
Figure 14:
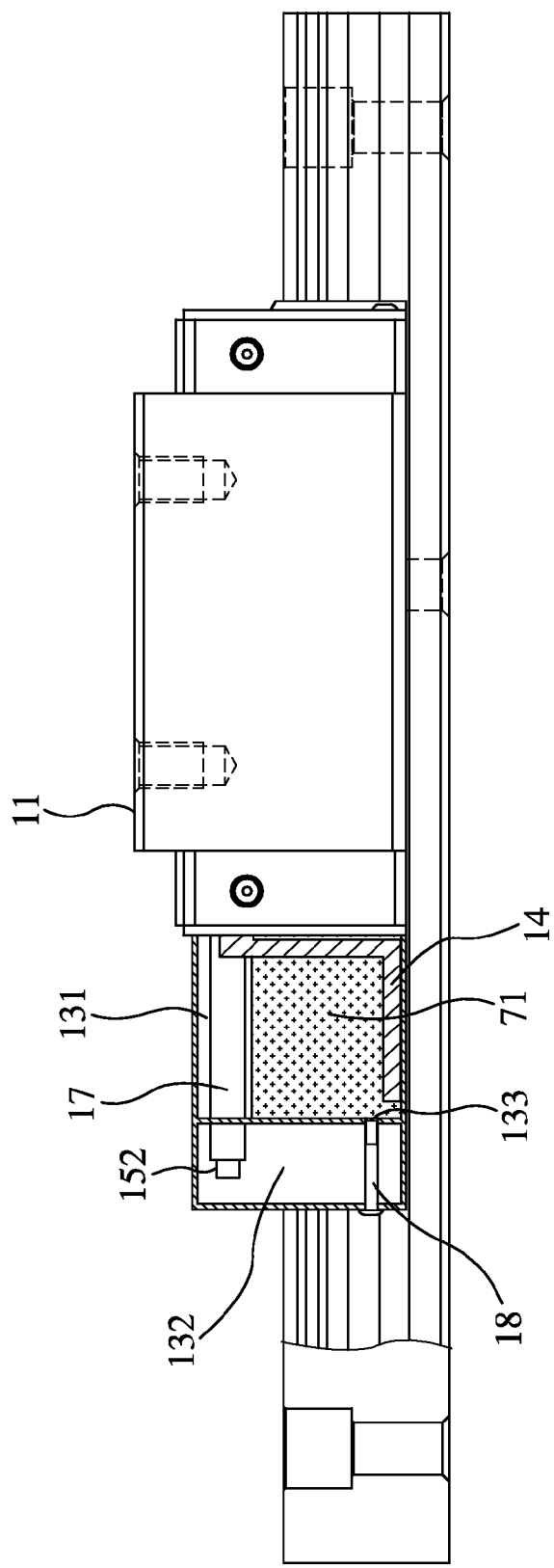
FIG. 14 is a sectional view of a part of the second preferred embodiment of the present invention, illustrating a linear slide rail as an example.

As shown in FIGS. 9-10, when the long shaft 81 is put upright, how each of the components works is the same as when the long shaft 81 is put transversally. However, it is to be noted that it is necessary to include the insulator 16 and to enable one end of the insulator 16 to protrude through the surface of the lubricating oil 71 to prevent the third oil-dischargeable portion 152 from contact with the lubricating oil 71 in such a way that the third oil-dischargeable portion 152 can extend through the through hole 161 to be located inside the oil room 131 without contact with the lubricating oil 71.

Referring to FIGS. 11-16, a linear transmission assembly having a lubricant recovery module in accordance with a second preferred embodiment of the present invention is similar to that of the first embodiment, having the following difference. The linear transmission assembly further includes a recovery room 132 made by partitioning off the oil room 131. The third oil-dischargeable portion 152 is inserted into the recovery room 132. An insulator 17 is fixed to the oil tank 13, having a through hole 171 communicating with the recovery room 132. The third oil-dischargeable potion 152 extends through the through hole 171 to be located inside the recovery room 132.

It deserves to mention that in the second embodiment, the recovery room 132 communicates with the oil room 131 via a through hole 133. Besides, if it is intended to adjust opening or closure of the through hole 133, an adjustor 18 movably threaded to the oil tank 13 can be employed for controlling the opening and closure of the through hole 133.

As shown in FIGS. 11-14, while the long shaft 81 is put transversally, the second oil-absorbable portion 141 can absorb the lubricating oil 71 from the oil room 131 and then the lubricating oil 71 can be conveyed to the second oil-dischargeable portion 142 to enter the chamber 111. Meanwhile, the first oil-absorbable portion 121 of the first oil wick 12 located inside the chamber 111 can keep absorbing the lubricating oil 71 inside the chamber 11 and conveying the lubricating oil 71 to the first oil-dischargeable portion 122 for lubricating the linear transmission device 80. At the same time, the third oil-absorbable portion 151 can keep absorbing the lubricating oil 71 inside the chamber 111 and the third oil-dischargeable portion 152 can discharge the lubricating oil to the recovery room 132 in such a way that it can prevent the first oil wick 12 from absorbing too much lubricating oil 71 resulting in overspill of the lubricating oil 71 to stain the linear transmission device 80.

As a matter of fact, as indicated in the drawings, we are aware that the third oil-dischargeable portion 152 can still be located over the surface of the lubricating oil 71 without contact therewith to recover the lubricating oil 71 from the chamber 111 to the oil room 131 if the insulator 16 is not available while the long shaft 81 is put transversally. It is different from when the long shaft 81 is put upright.

Figure 15:
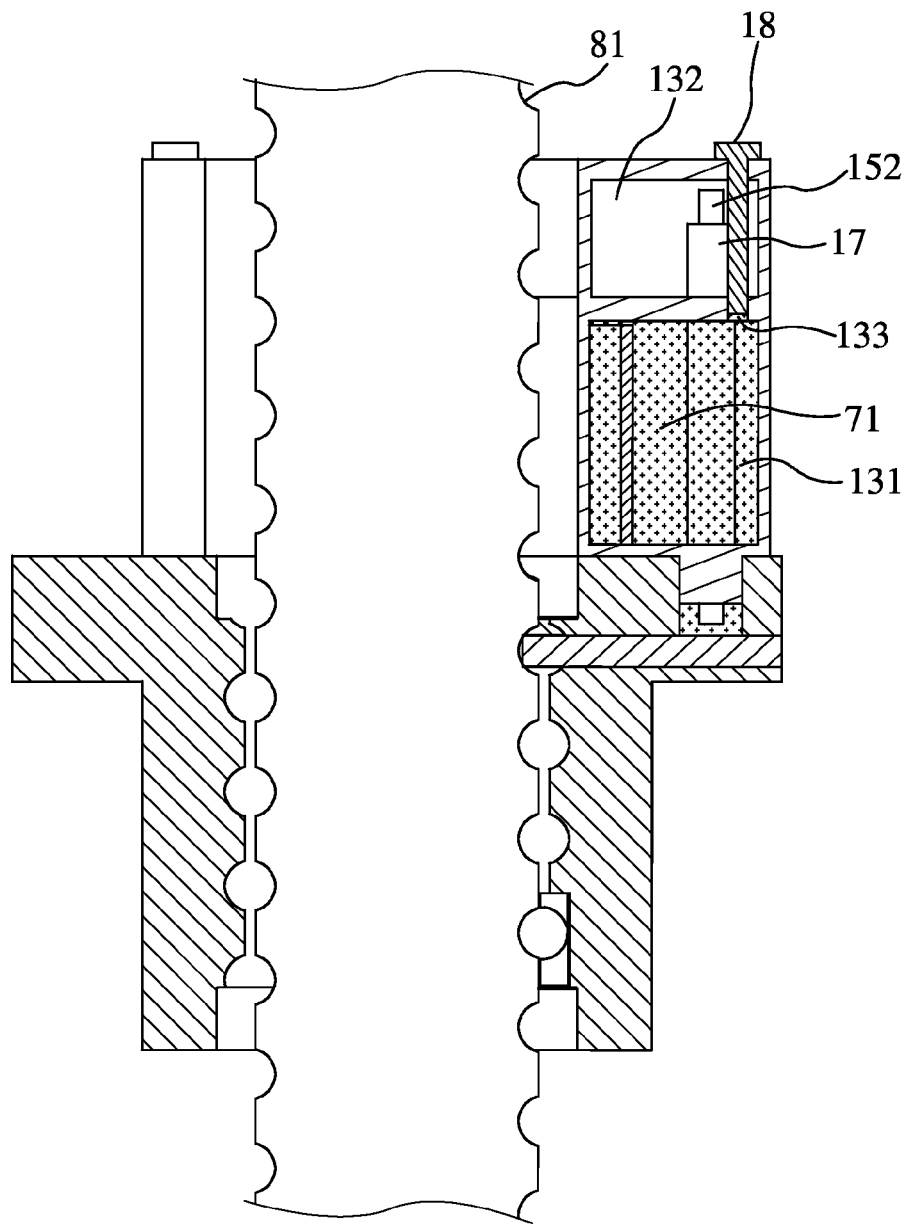
FIG. 15 is a sectional view of the second preferred embodiment of the present invention at work, illustrating that the long shaft is upright.
Figure 16:
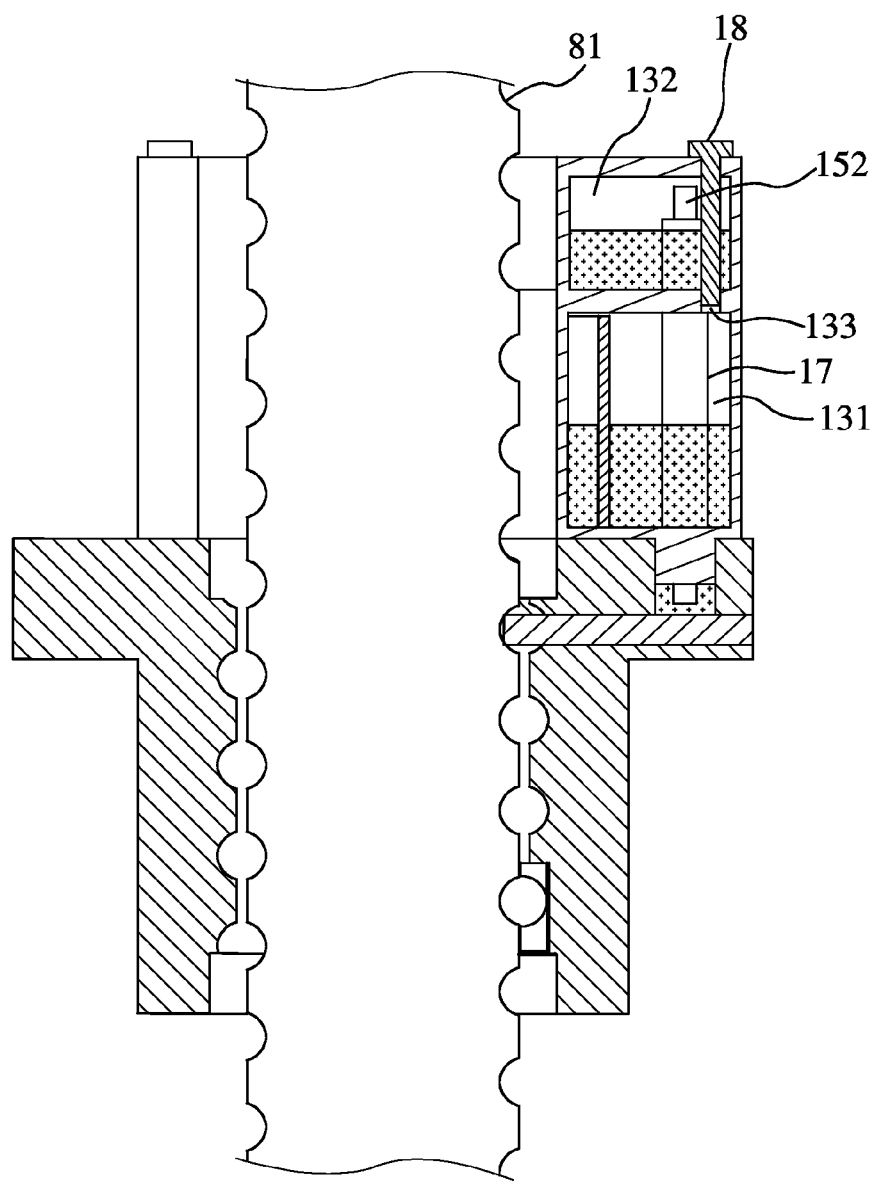
FIG. 16 is another sectional view of the second preferred embodiment of the present invention at work, illustrating that the long shaft is upright.

Referring to FIGS. 15-16, when the long shaft 81 is put upright, how each of the components works is the same as when the long shaft 81 is put transversally. However, it is to be noted that it is necessary to include the insulator 17 to prevent the third oil-dischargeable portion 152 from contact with the lubricating oil 71 in such a way that the third oil-dischargeable portion 152 can extend through the through hole 171 to be located inside the recovery room 132 without contact with the lubricating oil 71 inside the oil room 131.

In addition, under the circumstances that the recovery room 132 communicates with the through hole 133, the user can decide whether the recovered lubricating oil can flow back to the oil room 131 for reuse. As shown in FIG. 16, when the long shaft 81 is put upright, if it is considered that the gravity results in that the lubricating oil 71 naturally flows out of the recovery room 132, it will be necessary to additionally install the adjustor 18 for controlling the opening/closure of the through hole 133.

In conclusion, the present invention can recycle the lubricating oil to prevent the lubricating oil from overspill and staining the linear transmission device 80

Although the present invention has been described with respect to specific preferred embodiments thereof, it is in no way limited to the specifics of the illustrated structures but changes and modifications may be made within the scope of the appended claims.

What is claimed is:

1. A linear transmission assembly having a lubricant recovery module and coordinating with a long shaft to constitute a linear transmission device, the linear transmission assembly comprising:
    a movable member mounted to the long shaft for reciprocation with respect to the long shaft, the movable member having a chamber;
    a first oil wick inserted into the movable member and the chamber, the first oil wick having a first oil-absorbable portion and a first oil-dischargeable portion, the first oil-absorbable portion being mounted inside the chamber, the first oil-dischargeable portion extending out of the movable member for contact with the long shaft;
    an oil tank mounted to the movable member and having an oil room for storage of lubricating oil;
    a second oil wick mounted to the oil tank and having a second oil-absorbable portion and a second oil-dischargeable portion, the second oil-absorbable portion extending into the oil room for contact with the lubricating oil, the second oil-dischargeable portion extending out of the oil tank to reach the chamber; and
    a third oil wick mounted to the oil tank and having a third oil-absorbable portion and a third oil-dischargeable portion, the third oil-absorbable portion extending out of the oil tank to reach the chamber, the third oil-dischargeable portion being located inside the oil room with contact with the lubricating oil.

2. The linear transmission assembly as defined in claim 1, wherein each of the first, second, and third oil wicks is made of wool felt.

3. The linear transmission assembly as defined in claim 1 further comprising an insulator fixed to the oil tank, wherein the insulator has a through hole communicating with the oil room; the third oil-dischargeable portion extending through the through hole to be located inside the oil room without contact with the lubricating oil.

4. The linear transmission assembly as defined in claim 1, wherein the third oil-absorbable portion contacts the first oil-absorbable portion or the second oil-dischargeable portion.

5. The linear transmission assembly as defined in claim 1, wherein the oil room is partitioned off to make a recovery room; the third oil-dischargeable portion is inserted into the recovery room.

6. The linear transmission assembly as defined in claim 5 further comprising an insulator fixed to the oil tank, wherein the insulator has a through hole communicating with the recovery room; the third oil-dischargeable portion extending through the through hole to be located inside the recovery room.

7. The linear transmission assembly as defined in claim 6, wherein the recovery room communicates with the oil room via a through hole.

8. The linear transmission assembly as defined in claim 7 further comprising an adjustor movable threaded to the oil tank, wherein the through hole communicating with the recovery room and the oil room can be opened or closed by the adjustor.

9. The linear transmission assembly as defined in claim 5, wherein the third oil-absorbable portion contacts the first oil-absorbable portion or the second oil-dischargeable portion.

* * * * *